United States Patent [19]

Kotani et al.

[11] Patent Number: 4,921,470
[45] Date of Patent: May 1, 1990

[54] UNIVERSAL JOINT

[75] Inventors: Hiroshi Kotani; Yoshiyuki Inoue; Yasushi Kadota; Hidekazu Sakakibara; Kazuo Ide, all of Osaka; Kanichi Sumida, Yao, all of Japan

[73] Assignee: Koyo Seiko Co., Japan

[21] Appl. No.: 63,957

[22] Filed: Jun. 19, 1987

[30] Foreign Application Priority Data

Jun. 23, 1986 [JP] Japan .............................. 61-96227[U]
Dec. 12, 1986 [JP] Japan ................................ 61-297314

[51] Int. Cl.$^5$ .............................................. F16D 3/50
[52] U.S. Cl. ..................................... 464/151; 464/147
[58] Field of Search .................... 403/359; 464/73, 92, 464/106, 147, 149, 151, 155, 156, 157, 182

[56] References Cited

U.S. PATENT DOCUMENTS 3,399,549  9/1968  Nagele ............................ 403/359 X Primary Examiner—Daniel P. Stodola

[57] ABSTRACT

A universal joint including an intermediate joint member having a spherical portion as assembled and four ridges formed on the outer surface of the spherical portion and defining four guide furrows therebetween, and two shaft each having one end bifurcating into two arms. The two arms of one of the shafts are fitted in two of the guide furrows positioned symmetrically, and the two arms of the other shaft are fitted in the other two guide furrows positioned symmetrically. The entire joint member comprises two divided half segments arranged in combination axially of the member. Alternatively, the spherical portion comprises two divided half segments arranged in combination axially thereof, one of the spherical half segments being integrally formed with two of the ridges positioned symmetrically and extending to over the outer surface of the other spherical half segment, the other spherical half segment being integrally formed with the other two ridges positioned symmetrically and extending to over the outer surface of said one spherical half segment. In either of these arrangements, an elastic member is provided at the combined portion of the two segments inside the contour of the combined portion for biasing the segments at least circumferentially thereof out of register with each other.

17 Claims, 9 Drawing Sheets

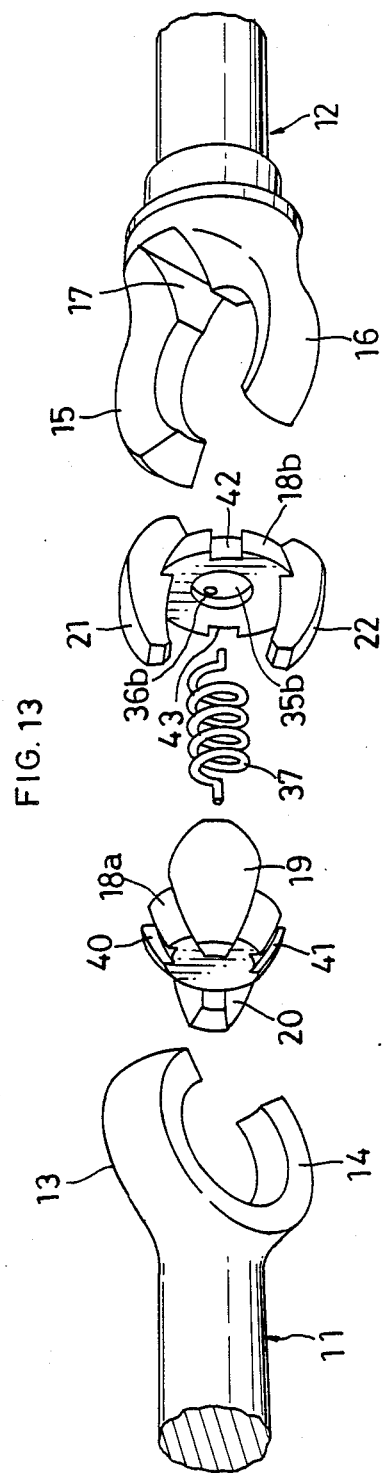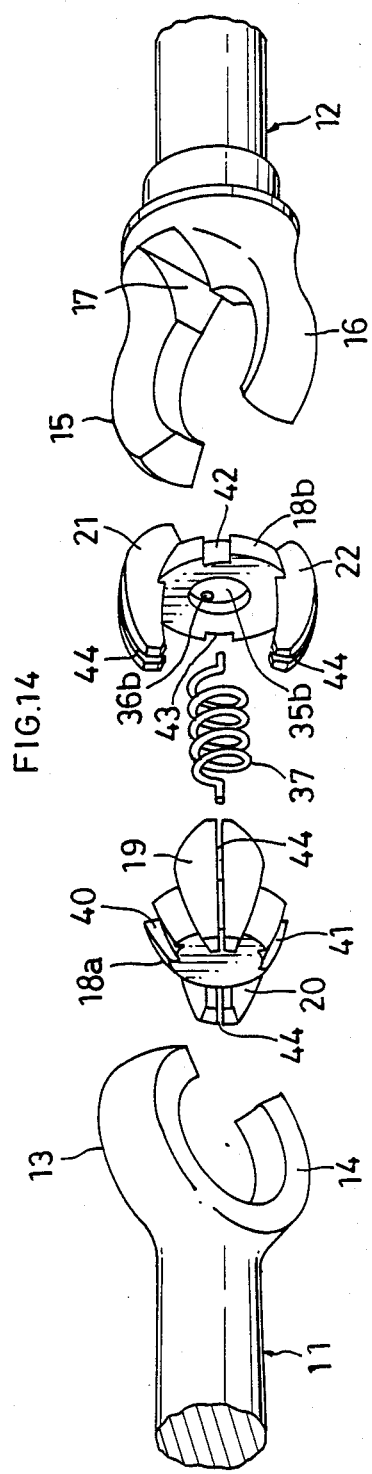
FIG. 13
FIG. 14

UNIVERSAL JOINT

BACKGROUND OF THE INVENTION

The present invention relates to universal joints, and more particularly to a universal joint which is called a ball joint and which is suitable for connecting an input shaft to an output shaft, for example, for use in vehicle steering mechanisms.

FIGS. 19 to 21 show a known universal joint of this type (see Unexamined Japanese Utility Model Publication SHO 59-122430).

The illustrated universal joint consists essentially of a substantially spherical intermediate joint member 10 made of synthetic resin and two metal shafts 11 and 12.

The first shaft 11, which is to be disposed at the drive side, has a first arm 13 and a second arm 14 projecting from its forward end in a bifurcated fashion. These two arms 13, 14 are trapezoidal in cross section, and are generally U-shaped in combination, resembling a partially cut-out circle. The inward opposed faces of the two arms 13, 14 form a segment of a spherical surface. The second shaft 12, which is to be disposed at the driven side, has a forward end bifurcating into a third arm 15 and a fourth arm 16 as in the case of the first shaft 11. The second shaft 12 is formed between its two arms 15, 16 a recess 17 for passing the arms 13, 14 of the first shaft 11 therethrough when the parts are assembled.

The intermediate joint member 10 as assembled comprises a spherical portion 18 and first to fourth four ridges 19, 20, 21 and 22 formed externally on the portion 18 and equidistantly arranged circumferentially thereof. The first and second ridges 19, 20 are arranged symmetrically about the center of the portion 18, and the third and fourth ridges 21, 22 are also arranged symmetrically as spaced from these ridges by 90 degrees about the center. The first and third ridges 19, 21 define a first guide furrow 23 therebetween, and the second and fourth ridges 20, 22 symmetrical with these ridges define a second guide furrow 24 therebetween. The third and second ridges 21, 20 define a third guide furrow 25 therebetween, and the fourth and first ridges 22, 19 symmetrical with the ridges 20, 21 define a fourth guide furrow 26 therebetween.

The entire intermediate joint member 10 is divided into first and second two divided half joint segments 10a, 10b arranged axially thereof. The first segment 10a comprises a first spherical half segment 18a obtained by dividing the spherical portion 18 into two equal portions, and first half portions 19a, 20a, 21a and 22a of the four ridges 19, 20, 21 and 22 integrally formed on the outer surface of the spherical half segment 18a. The second joint member half segment 10b comprises the other half of the spherical portion 18, i.e., a second spherical half segment 18b, and second half portions 19b, 20b, 21b and 22b of the four ridges 19 to 22 integrally formed on the outer surface of the spherical half segment 18b. The two half segments 10a, 10b are combined with their cross-shaped inner faces 27a, 27b opposed to each other to form the joint member 10 which is substantially spherical. The combination faces 27a, 27b of the joint half segments 10a, 10b are formed with spring accommodating cavities 28a, 28b, respectively, having a U-shaped metal spring 29 fitted therein. The spring 29 provided between the bottoms of the cavities 28a, 28b has opposite ends 29a slightly projecting into the first and fourth guide furrows 23, 26 at opposite sides of the first ridge 19.

The first arm 13 of the first shaft 11 is fitted in the first guide furrow 23 of the joint member 10, and the second arm 14 thereof in the second guide furrow 24. The third arm 15 of the second shaft 12 is fitted in the third guide furrow 25 of the joint member 10, and the fourth arm 16 thereof in the fourth guide furrow 26. The spring ends 29a projecting into the first and fourth guide furrows 23, 26 are in pressing contact with the first arm 13 and the fourth arm 16, thereby precluding backlashing.

The rotation of the first shaft 11 is transmitted to the second shaft 12 through the intermediate joint member 10. In the case of forward rotation, the arms 13, 14, 15, 16 of the two shafts 11, 12 are in contact with the ridges 19, 20 of the intermediate joint member 10 at four locations for power transmission. In the case of reverse rotation, the arms 13, 14, 15, 16 are in contact with the ridges 21, 22 at other four locations, whereby the power is transmitted. More specifically stated, when the first shaft 11 is rotated forward as indicated by an arrow X in FIG. 21, a side face 13a of the first arm 13 of the first shaft 11, i.e., the forward side thereof with respect to the direction of forward rotation, pushes the rearward side face, with respect to the direction of forward rotation, of the first ridge 19; the forward side face 14a, with respect to the direction of forward rotation, of the second arm 14 pushes the rearward side face, with respect to the direction of forward rotation, of the second ridge 20; the forward side face, with respect to the direction of forward rotation, of the first ridge 19 pushes the rearward side face 16a with respect to the direction of forward rotation, of the fourth arm 16; and the forward side face, with respect to the direction of forward rotation, of the second ridge 20 pushes the rearward side face 15a, with respect to the direction of forward rotation, of the third arm 15. Consequently, the second shaft 12 is rotated in the same direction as the first shaft 11. Further when the first shaft 11 is rotated reversely as indicated by an arrow Y in FIG. 21, the forward side face 13b, with respect to the direction of reverse rotation, of the first arm 13 of the first shaft 11 pushes the rearward side face, with respect to the direction of reverse rotation, of the third ridge 21; the forward side face 14b, with respect to the direction of reverse rotation, of the second arm 14 pushes the rearward side face, with respect to the direction of reverse rotation, of the fourth ridge 22; the forward side face, with respect to the direction of reverse rotation, of the third ridge 21 pushes the rearward side face 15b, with respect to the direction of reverse rotation, of the third arm 15; and the forward side face, with respect to the direction of reverse rotation, of the fourth ridge 22 pushes the rearward side face 16b, with respect to the direction of reverse rotation, of the fourth arm 16, whereby the second shaft 12 is rotated in the same direction as the first shaft 11.

With the universal joint described above, the two shafts 11, 12 are moved along the guide furrows 23, 24 and 25, 26 in the joint member 10, whereby the angle (operation angle) between the two shafts 11, 12 is variable as desired. However, when an operation angle is given, the rotation of the shafts 11, 12 reciprocatingly moves the arms 13, 14, 15, 16 in directions along the guide furrows 23, 24, 25, 26 relative to the joint member 10, whereby the opposite ends 29a of the spring 29 are reciprocatingly moved on the arms 13, 16 in pressing contact therewith. Since the spring 29 thus slidingly moves on the arms 13, 16 relative thereto in metal-to-metal contact, the spring 29 or the arms 13, 16 undergo marked wear, rendering the spring 29 inoperative as such within a relatively short period of time to permit backlashing.

SUMMARY OF THE INVENTION

The main object of the present invention is to provide a universal joint which is operable free of any backlash over a prolonged period of time.

The present invention provides a universal joint of the type described above wherein the entire intermediate joint member comprises two divided half segments arranged in combination axially thereof, the universal joint being characterized in that an elastic member is provided at the combined portion of the two half segments inside the contour of the portion for biasing the half segments at least circumferentially thereof out of register with each other.

With the arrangement described above, the two half segments constituting the intermediate joint member are biased circumferentially thereof out of register by an elastic member, so that the ridge of the joint member and the arm of the shaft can be prevented from backlashing relative to each other. The elastic member is disposed inside the contour of the combined portion of the two half segments of the joint member and therefore will not project into the guide furrow unlike the conventional spring whose opposite ends bear against the shaft arms in metal-to-metal contact. This diminishes the wear of the shaft arms, joint half segments and elastic member, effectively obviating backlashes over a prolonged period of time. Further the arrangement wherein the power is delivered through the elastic member between the two joint half segments prevents transmission of vibration to achieve a high damper effect. Accordingly, the present joint does not require any damper, for example, for the shaft arm portion unlike the conventional device and can therefore be designed as a compact structure.

The present invention further provides a universal joint of the type described above wherein the spherical portion of the intermediate joint member comprises two divided half segments arranged axially thereof in combination, the universal joint being characterized in that one of the spherical half segments is integrally formed with two ridges positioned symmetrically and extending therefrom to over the outer surface of the other spherical half segment, the other spherical half segment being integrally formed with two ridges positioned symmetrically and extending therefrom to over the outer surface of the above-mentioned one spherical half segment, a biasing member being provided at the combined portion of the two spherical half segments inside the contour of the combined portion for biasing the two spherical half segments at least circumferentially thereof out of register.

In addition to the foregoing advantages, this universal joint has the following advantages. Of the four ridges on the intermediate joint member, two ridges symmetrically positioned are formed on only one of the spherical half segments, and the remaining two ridges symmetrically positioned are provided only on the other spherical half segment, so that the two arms of the first shaft and the two arms of the second shaft are not restrained by both the two ridges on one of the half segments and the two ridges on the other half segment at the same time. Accordingly, even if the constituent parts are somewhat low in dimensional accuracy, the two ridges of either one of the spherical half segments invariably come into contact with the two arms of the first shaft and the two arms of the second shaft at the aforementioned four side face portions with the same force at the same time in either case of forward or reverse rotation. This precludes variations in the sliding frictional resistance between the ridge and the arm, assuring effective power transmission from one shaft to the other shaft. When the joint is used, for example, in a vehicle steering mechanism, the steering means can therefore be manipulated with a constant force with an improved feel to the hand.

BRIEF DESCRIPTION OF THE DRAWINGS

FIG. 13 is an exploded perspective view showing a sixth embodiment of the invention;

FIG. 14 is an exploded perspective view showing a seventh embodiment of the invention;

DESCRIPTION OF THE PREFERRED EMBODIMENTS

Figure 1:
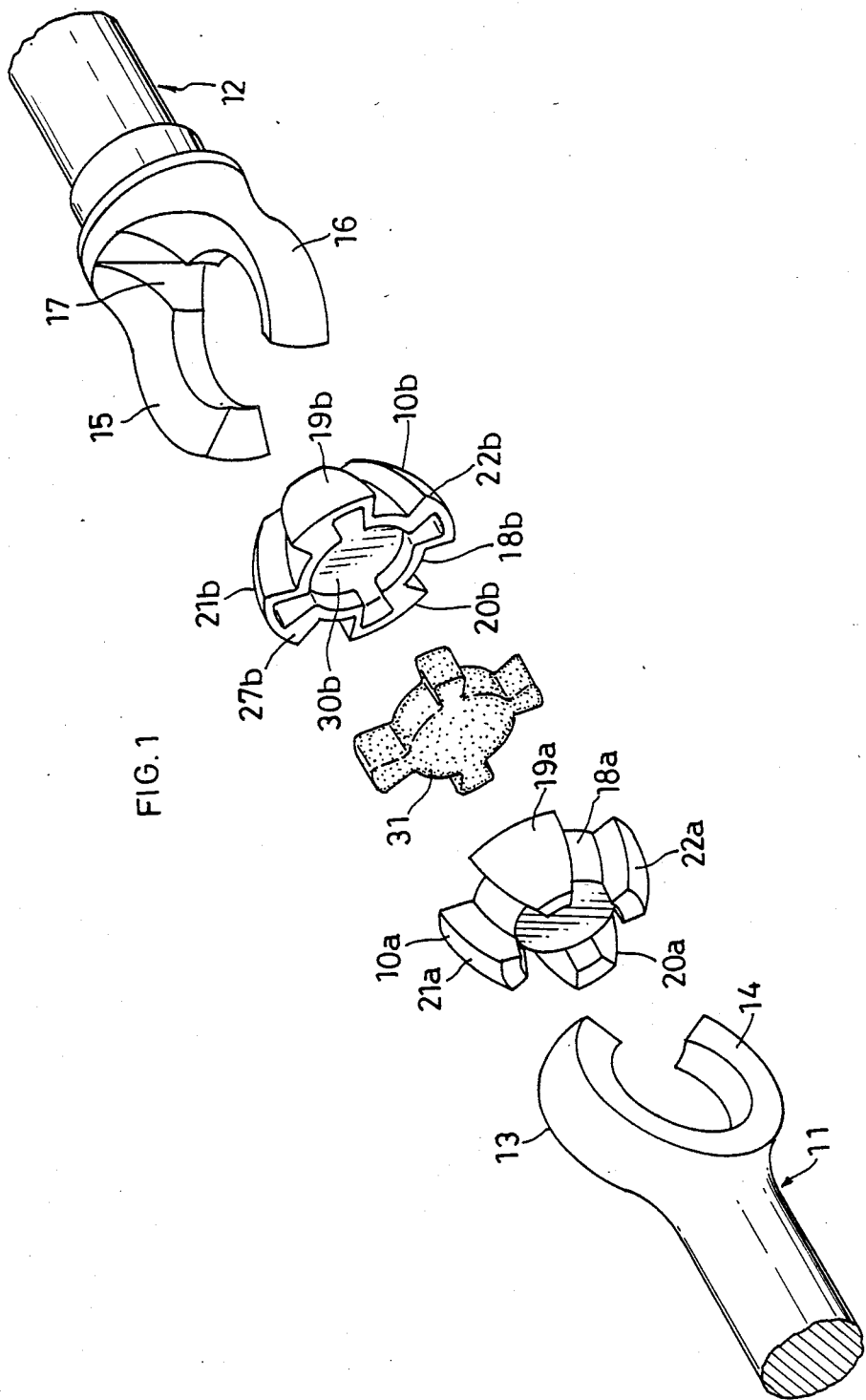
FIG. 1 is an exploded perspective view showing a universal joint as a first embodiment of the invention.

The present invention will be described below in greater detail with reference to the accompanying drawings. Throughout the drawings, like parts are designated by like reference numerals and characters.

Figure 2:
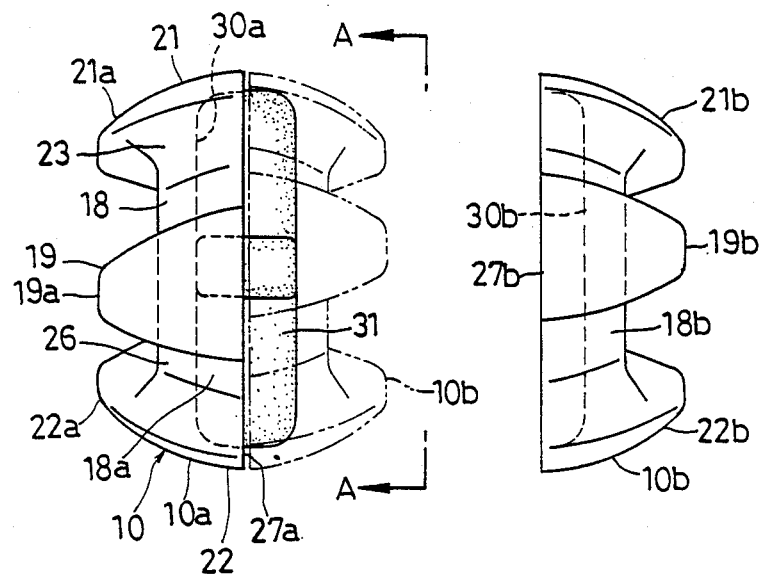
FIG. 2 is a partly exploded side elevation showing the intermediate joint member of FIG. 1.
Figure 3:
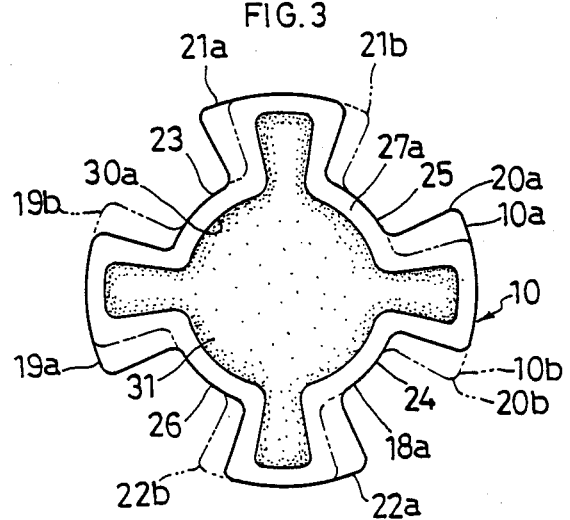
FIG. 3 is a view of the same member as it is seen in the direction of arrows A—A in FIG. 2.

FIGS. 1 to 3 show a first embodiment. The universal joint of the first embodiment includes an intermediate joint member 10. The entire joint member 10, like the conventional one, comprises two divided half segments 10a, 10b arranged axially thereof in combination. The two half segments 10a, 10b are exactly identical in shape. The half segments 10a, 10b have substantially cross-shaped opposed combination faces 27a, 27b, respectively. Each of these combination faces 27a, 27b has a generally cross-shaped rubber plate accommodating cavity 30a (30b) similar in contour to the face 27a (27b) and including a circular portion and extensions extending from the outer periphery of the circular portion radially outward in four directions. The four radial extensions of each cavity 30a (30b) are circumferentially slightly displaced from the centers of ridge half portions 19a, 20a, 21a, 22a (19b, 20b, 21b, 22b) on the joint half segment 10a (10b), respectively. The two joint half segments 10a, 10b are so arranged that the cavities 30a, 30b in the combination faces 27a, 27b are opposed to each other. A rubber plate (elastic member) 31 identical to the cavities 30a, 30b in configuration is accommodated in the cavities, with approximate one half of its thickness fitted in each cavity. Accordingly, the two half segments are circumferentially slightly displaced relative to each other from the position where the corresponding ridge half portions in each pair 19a, 19b (20a, 20b; 21a, 21b; 22a, 22b) are in register. When the two joint half segments 10a, 10b are rotated relative to each other so that the corresponding ridge half portions in each pair are in register, the rubber plate 31 exerts on the two joint half segments 10a, 10b an elastic force acting to circumferentially displace these segments from each other. In a free state, the rubber plate 31 has a thickness which is slightly larger than the distance between the bottoms of the cavities 30a, 30b when the combination faces 27a, 27b are in intimate contact with each other, with the result that the two joint segments 10a, 10b are also elastically biased away from each other axially thereof by the rubber plate 31.

As is the case with the conventional joint already described, shafts 11, 12 are attached to the joint member 10. Arms 13, 14, 15, 16 of these shafts 11, 12 are fitted in the corresponding guide furrows 23, 24, 25, 26, with the corresponding ridge half portions 19a, 19b; 20a, 20b; 21a, 21b; 22a, 22b on the two joint segments 10a, 10b in register against the elastic force of the rubber plate 31. Since the two joint half segments 10a, 10b are biased circumferentially out of register by the rubber plate 31 in this arrangement, each of the ridges 19, 20, 21, 22 of the joint member 10 is in pressing contact with two of the shaft arms 13, 14, 15, 16 which are respectively positioned on the opposite sides thereof. The two joint half segments 10a, 10b are also biased away from each other axially thereof by the rubber plate 31, so that the outer surface of the spherical portion 18 of the joint member 10 or the side faces of the ridges 19 to 22 are in pressing contact with the arms 13 to 16 of the shafts 11, 12 in corresponding relation. Consequently, the joint member 10 is prevented from backlashing relative to the shaft arms 13 to 16. The rubber plate 31 is provided inside the contours of the combination faces 27a, 27b of the joint half segments 10a, 10b without projecting into the guide furrows 23 to 26. The rubber plate 31 is therefore held out of contact with the arms 13 to 16 of the shafts 11, 12, with the two joint half segments 10a, 10b only in contact with the shaft arms 13 to 16. Further the rubber plate 31 does not have any portion which would be in metal-to-metal contact with other members unlike the conventional spring whose opposite ends contact shaft arms. This diminishes the wear of the shaft arms 13 to 16, joint half segments 10a, 10b and rubber plate 31, effectively obviating backlashes over a prolonged period of time. The arrangement wherein the power is delivered through the rubber plate 31 prevents transmission of vibration to achieve a high damping effect.

Figure 4:
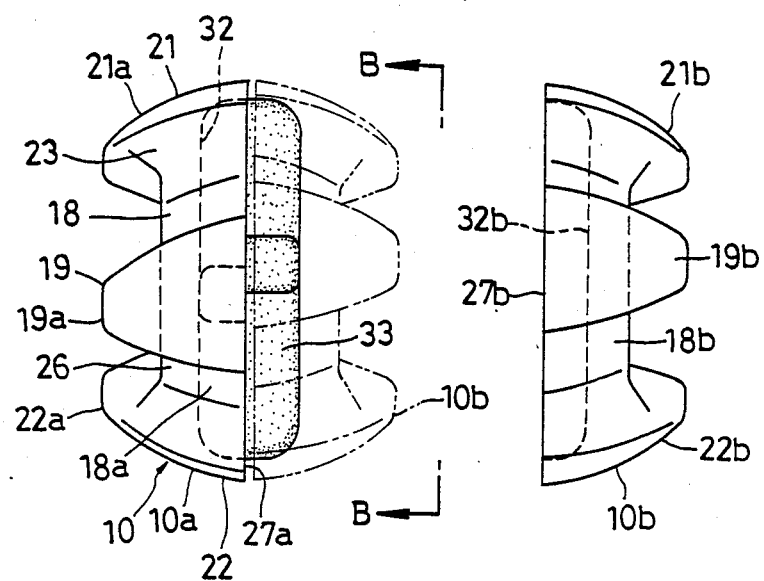
FIG. 4 is a partly exploded side elevation showing an intermediate joint member included in a second embodiment of the invention.
Figure 5:
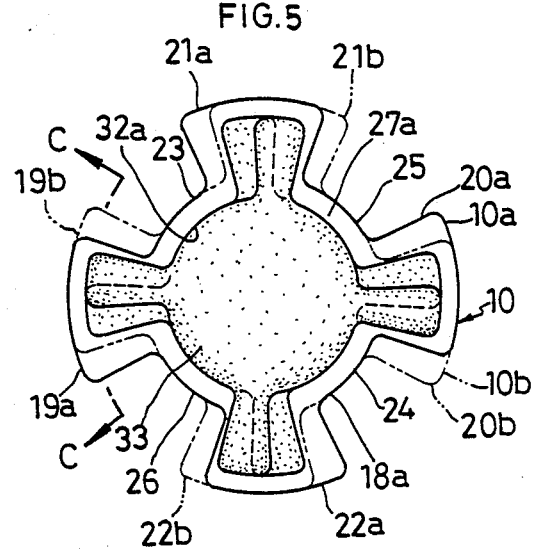
FIG. 5 is a view of the same member as it is seen in the direction of arrows B—B in FIG. 4.
Figure 6:
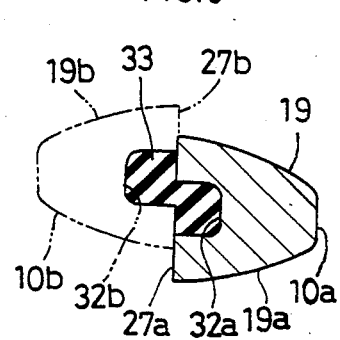
FIG. 6 is a view in section taken along the line C—C in FIG. 5.

FIGS. 4 to 6 show a second embodiment. The univeral joint of the second embodiment includes a joint member 10 which comprises two half segments 10a, 10b exactly identical in shape. As in the case of the first embodiment, the opposed combination faces 27a, 27b of the joint half segments 10a, 10b are respectively formed with substantially cross-shaped rubber plate accommodating cavities 32a, 32b. A rubber plate (elastic member) 33 identical to the cavities 32a, 32b in shape is accommodated in these cavities, with an approximately one-half portion of its thickness fitted in each cavity. However, the second embodiment differs from the first in that the four radial extensions of the cavity 32a (32b) of each joint half segment 10a (10b) are formed in the centers of ridge half portions 19a, 20a, 21a, 22a (19b, 20b, 21b, 22b), respectively, and in that the four radial projections of the rubber plate 33 at one side of the center of its thickness are circumferentially slightly displaced from those on the other side thereof. Consequently, when approximate halves of the thickness of the rubber plate 33 are fitted in the cavities 32a, 32b of the two joint half segments 10a, 10b, respectively, the two segments 10a, 10b are circumferentially slightly displaced from the position where the corresponding ridge half portions in each pair 19a, 19b (20a, 20b; 21a, 21b; 22a, 22b) are in register.

With the exception of these features, the second embodiment has the same construction as the first.

Figure 7:
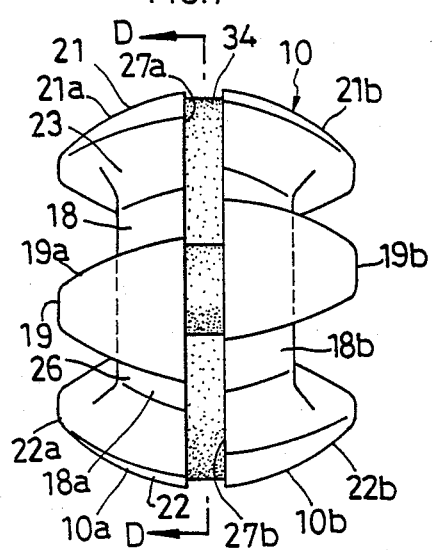
FIG. 7 is a partly exploded side elevation showing an intermediate joint member included in a third embodiment of the invention.
Figure 8:
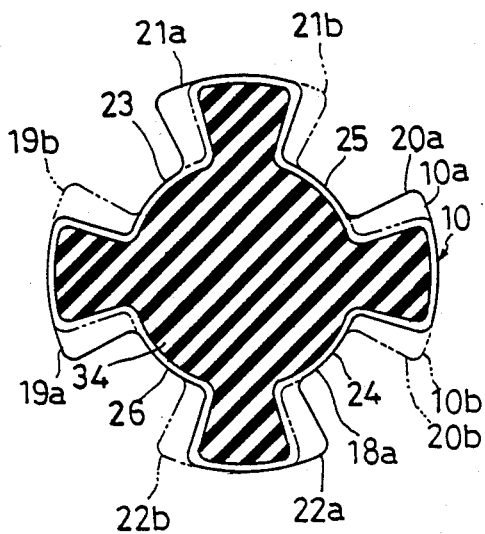
FIG. 8 is a view in section taken along the line D—D in FIG. 7.

FIGS. 7 and 8 show a third embodiment. The universal joint of the third embodiment includes a joint member 10 which comprises two half segments 10a, 10b of exactly identical shape. The combination faces 27a, 27b of the half segments 10a, 10b are planar unlike those of the first embodiment. A rubber plate (elastic member) 34 the same as the rubber plate 31 of the first embodiment is held between the combination faces 27a, 27b. The rubber plate 34 is smaller than these faces 27a, 27b in contour. The rubber plate 34 as positioned inside the contours of the faces 27a, 27b are adhered at its opposite surfaces to these combination faces so that the two joint half segments 10a, 10b are circumferentially slightly displaced from the position where the corresponding ridge half portions in each pair 19a, 19b (20a, 20b; 21a, 21b; 22a, 22b) are in register.

With the exception of these features, the third embodiment has the same construction as the first.

The rubber plates 31, 33, 34, as well as the cavities 30a, 32b, 32a, 32b in the joint half segments 10a, 10b, are not limited to those of the foregoing embodiments in respect of shape but can be altered suitably. For example, the rubber plate may have a central circular cutout portion or may comprise a plurality of rubber strips arranged radially and held between the two joint half segments.

Figure 9:
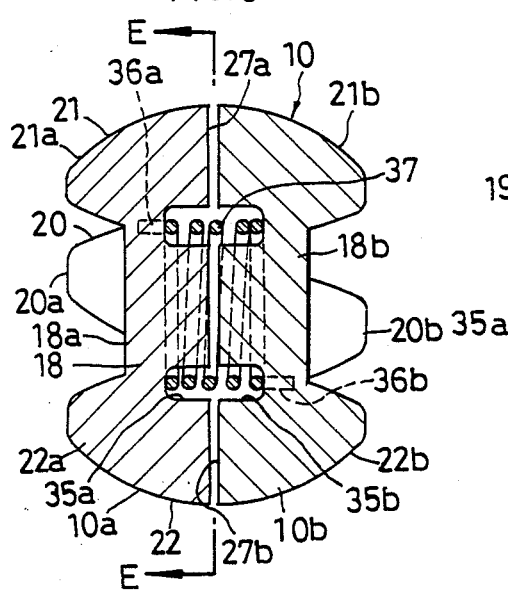
FIG. 9 is a side elevation in section showing an intermediate joint member included in a fourth embodiment of the invention.
Figure 10:
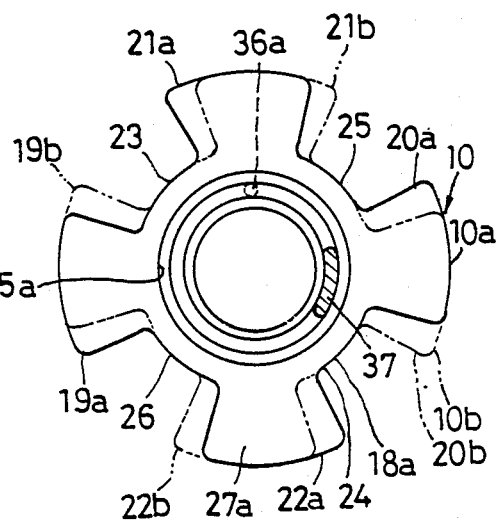
FIG. 10 is a view in section taken along the line E—E in FIG. 9.

FIGS. 9 and 10 show a fourth embodiment. The univeral joint of the fourth embodiment comprises two joint half segments 10a, 10b also identical in shape and constituting a joint member 10. Spring accommodating circular cavities 35a, 35b are formed in the combination faces 27a, 27b of the segments 10a, 10b centrally thereof. These cavities 35a, 35b respectively have small spring retaining bores 36a, 36b each formed in the bottom of the cavity and positioned close to its periphery. Approximately half length portions of a coiled torsion spring (elastic member) 37 are fitted in the cavities 35a, 35b of the two joint half segments 10a; 10b, with the opposite ends of the spring 37 engaged in the bores 36a, 36b. When the spring 37 is subjected to no torsional force, the two joint half segments 10a, 10b are circumferentially slightly displaced from the position where the corresponding ridge half portions in each pair 19a, 19b (20a, 20b; 21a, 21b; 22a, 22b) are in register. When the two joint segments 10a, 10b are rotated relative to each other so that the corresponding ridge half portions in each pair are in register, the spring 37 biases the two joint half segments 10a, 10b in directions to displace them relative to each other circumferentially thereof. In a free state, the spring 37 has a length slightly larger than the distance between the bottoms of the cavities 35a, 35b when the combination faces 27a, 27b of the segments 10a, 10b are in intimate contact with each other, with the result that the two joint half segments 10a, 10b are also biased away from each other axially thereof.

With the exception of these features, the fourth embodiment has the same construction as the first.

Any elastic member is useful insofar as it is capable of biasing the two joint half segments at least circumferentially thereof out of register. Thus, useful elastic members are not limited to those of the foregoing embodiments in material and construction. In place of the coiled torsion spring, for example, a plate spring may be attached to the combination faces of the two joint half segments inside the contours of these faces for biasing the two half segments circumferentially thereof out of register.

Figure 11:
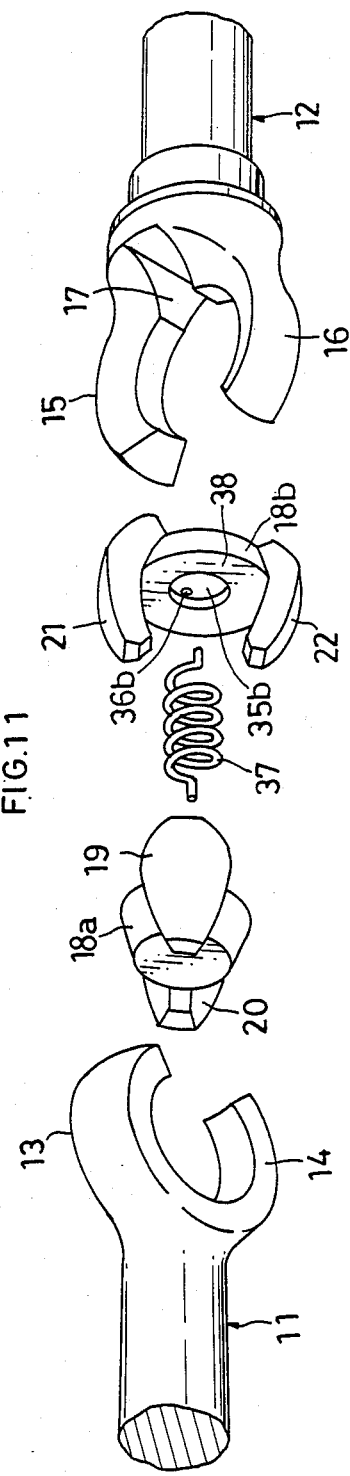
FIG. 11 is an exploded perspective view showing a fifth embodiment of the invention.
Figure 12:
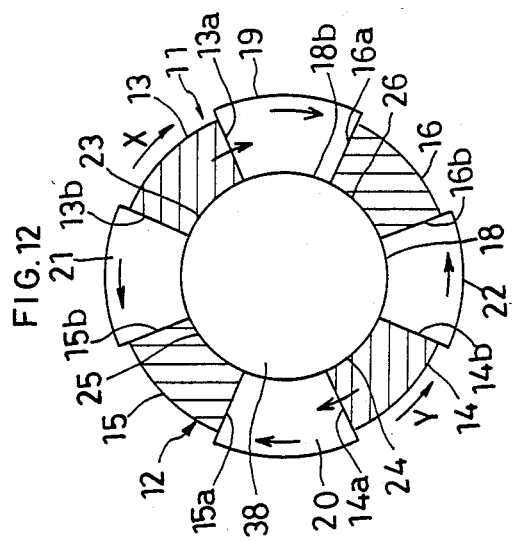
FIG. 12 is a cross sectional view showing the intermediate joint member of FIG. 11.
Figure 19:
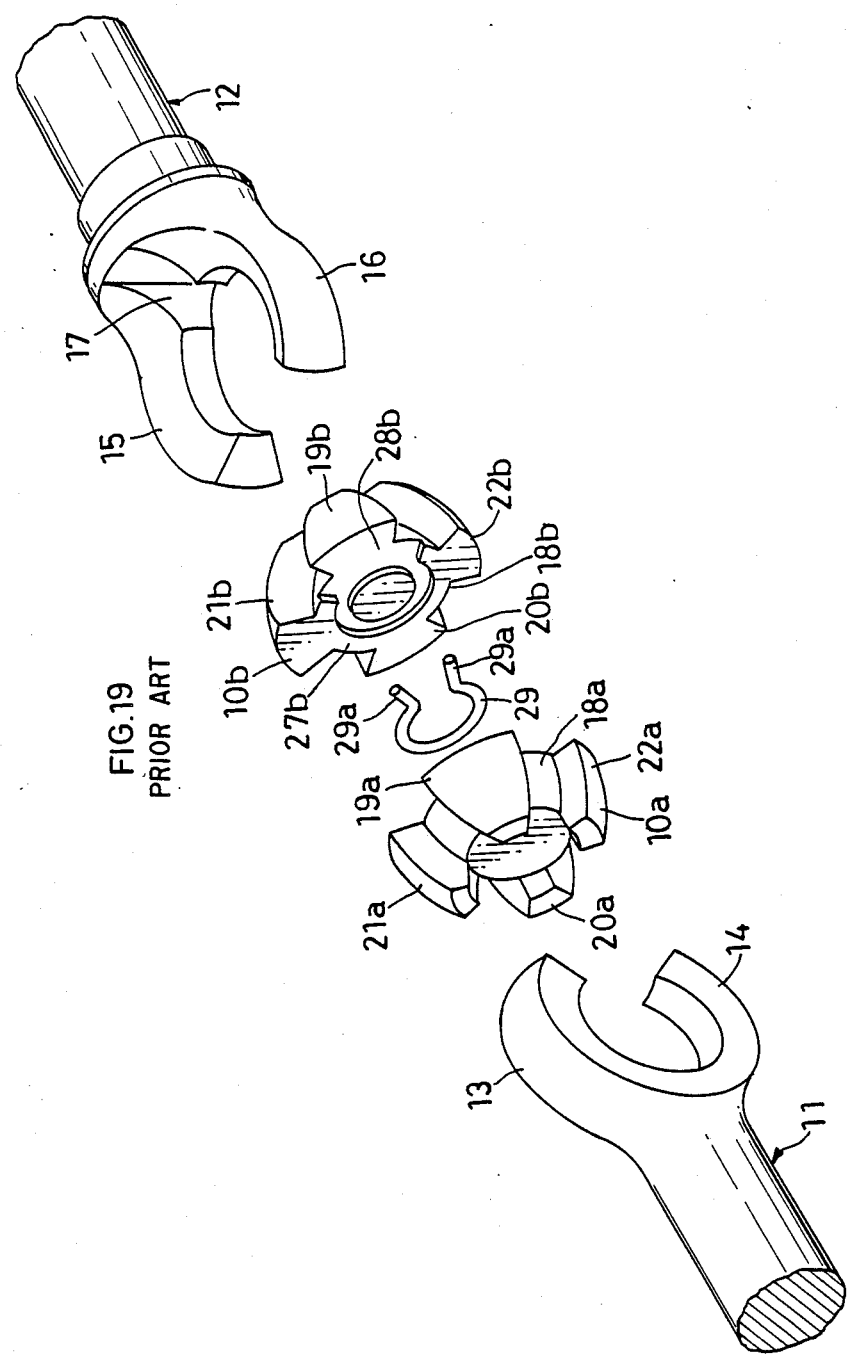
FIG. 19 is an exploded perspective view showing a conventional universal joint.
Figures 20, 21:
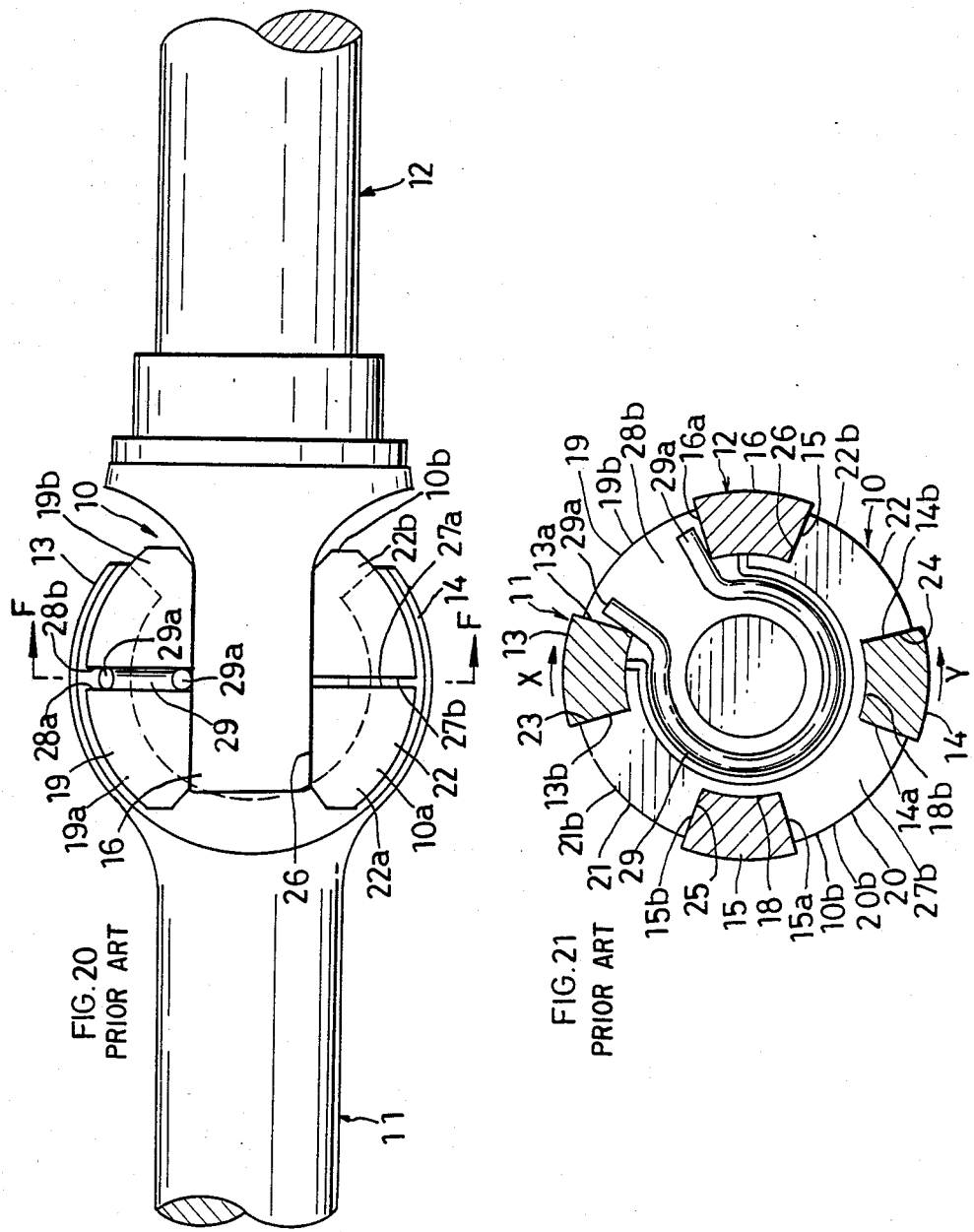
FIG. 20 is a side elevation showing the joint as assembled.
FIG. 21 is a view in section taken along the line F—F in FIG. 20.

FIGS. 11 and 12 show a fifth embodiment. The joint member 10 of the universal joint according to this embodiment has a spherical portion 18 which comprises two divided half segments 18a, 18b arranged axially thereof in combination. The first spherical half segment 18a has integrally formed on its outer surface a first ridge 19 and a second ridge 20 which are positioned symmetrically and extend therefrom to over the outer surface of the second spherical half segment 18b. The inward opposed faces of these two ridges 19, 20 extending over the second spherical half segment 18b are each in the form of a segment of a spherical surface so as to fit around the second segment 18b. Similarly, the second spherical half segment 18b has integrally formed on its outer surface a third ridge 21 and a fourth ridge 22 which are positioned symmetrically and extend therefrom to over the outer surface of the first segment 18a.

The two spherical half segments 18a, 18b are combined with their combination faces 38 opposed to each other, utilizing the elastic deformation of the ridges 19 to 22 which are made of synthetic resin. As in the case of the fourth embodiment, a coiled torsion spring 37 for biasing the segments 18a, 18b circumferentially thereof out of register and axially away from each other is provided between the combination faces 38 of the segments 18a, 18b inside the contours of these faces.

The first ridge 19 and the second ridge 20 which are symmetrically positioned are provided only on the first spherical half segment 18a, while the other third and fourth ridges 21, 22 symmetrically positioned are provided on the second spherical half segment 18b only. This eliminates the likelihood that the two arms 13, 14 of the first shaft 11 and the two arms 15, 16 of the second shaft 12 will be restrained by the two ridges 19, 20 on the first segment 18a and the two ridges 21, 22 on the second segment 18b at the same time. Accordingly, even if the parts differ in dimensional accuracy, for example, even if the ridge 19 is smaller than the other ridges 20, 21, 22 in width, power can be transmitted from shaft to shaft properly for forward or reverse rotation. Stated more specifically, when the first shaft 11 is rotated forward (in the direction of arrow X in FIG. 12), the forward side face 13a, with respect to the direction of forward rotation, of the first arm 13 comes into contact with the rearward side face, with respect to the direction of forward rotation, of the first ridge 19; the forward side face 14a, with respect to the direction of forward rotation, of the second arm 14 contacts the rearward side face, with respect to the direction of forward rotation, of the second ridge 20; the forward side face, with respect to the direction of forward rotation, of the first ridge 19 contacts the rearward side face 16a, with respect to the direction of forward rotation, of the fourth arm 16; and the forward side face, with respect to the direction of forward rotation, of the second ridge 20 contacts the rearward side face 15a, with respect to the direction of forward rotation, of the third arm 15. Thus, contact takes place at four locations with the same force. Further when the first shaft 11 is rotated reversely (in the direction of arrow Y in FIG. 12), contact also occurs at four locations with the same force as will be described below (the terms "forward" and "rearward" being used with respect to the direction of reverse rotation). The forward side face 13b of the first arm comes into contact with the rearward side face of the third ridge 21, the foward side face 14b of the second arm 14 with the rearward side face of the fourth ridge 22, the forward side face of the third ridge 21 with the rearward side face 15b of the third arm 15, and the forward side face of the fourth ridge 22 with the rearward side face 16b of the fourth arm 16. Thus, in either case of forward or reverse rotation, the parts concerned contact at the four locations at the same time with the same force without being influenced by variations in dimensional accuracy of the parts. This precludes variations in sliding frictional resistance between the contact portions during the rotation.

FIG. 13 shows a sixth embodiment which differs from the fifth embodiment in that each of the two spherical half segments, 18a (18b) is formed in the outer surface thereof with grooves 40, 41 (42, 43) for positioning the ridges 21, 22 (19, 20) on the other half segment 18b (18a).

The grooves 40, 41 in the first spherical half segment 18a are formed between the first ridge 19 and the second ridge 20 for the third ridge 21 and the fourth ridge 22 on the second spherical half segment 18b respectively to fit in. The grooves 42, 43 in the second segment 18b are formed between the third ridge 21 and the fourth ridge 22 for the first ridge 19 and the second ridge 20 on the first segment 18a to fit in respectively. The thickness, diametrically of the segments, of the projecting portions of the ridges 19 to 22 fitting in the grooves 40 to 43 is greater than in the fifth embodiment by an amount corresponding to the depth of the grooves 40 to 43. The circumferential width of the grooves 40 to 43 is slightly larger than the width of the corresponding ridges 19 to 22.

The sixth embodiment has the advantage that the ridges 19 to 22 can be positioned easily when assembling the two spherical half segments 18a, 18b.

Except these features, the sixth embodiment has the same construction as the fifth.

FIG. 14 shows a seventh embodiment, which differs from the sixth embodiment in that each of the ridges 19, 20, 21, 22 on the two spherical half segments 18a, 18b is formed with a slit 44 extending over the entire length of the ridge at the center of its width.

The ridges 19 to 22 are slightly larger in width than those of the sixth embodiment. With the arms 13 to 16 of the two shafts 11, 12 fitted in the guide furrows 23 to 26, the slits 44 have a reduced width to prevent the arms 13, 14 of the first shaft 11 and the arms 15, 16 of the second shaft 12 from backlashing relative to each other in the direction of rotation.

Thus, the seventh embodiment is adapted to cause the slits 44 to absorb variations in the dimensional accuracy of the ridges 19, 20, 21, 22 due to processing or working errors, permitting the two arms 13, 14 of the first shaft 11 and the two arms 15, 16 of the second shaft 12 to come into contact with all the ridges 19, 20, 21, 22 substantially with the same force for rotation.

With the universal joints of the type described, the arms 13 to 16 of the two shafts 11, 12 are adapted for sliding contact with the ridges 19 to 22 on the joint member 10 at the adjacent side faces thereof arranged circumferentially of the member, so that there arises a need to apply a lubricant to the contact portions.

Figure 15:
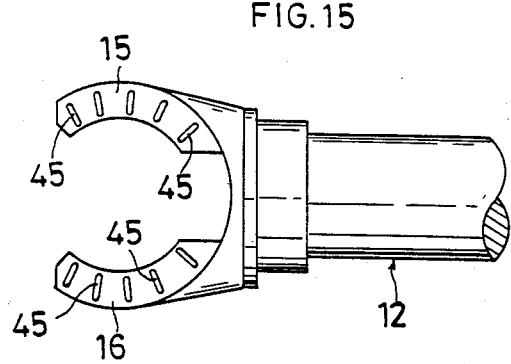
FIG. 15 is a side elevation showing a modification of shaft arms.
Figure 16:
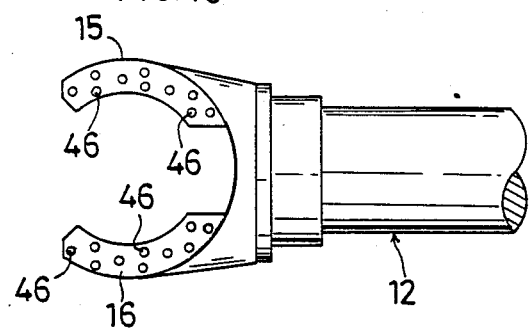
FIG. 16 is a side elevation showing another modification of shaft arms.
Figure 17:
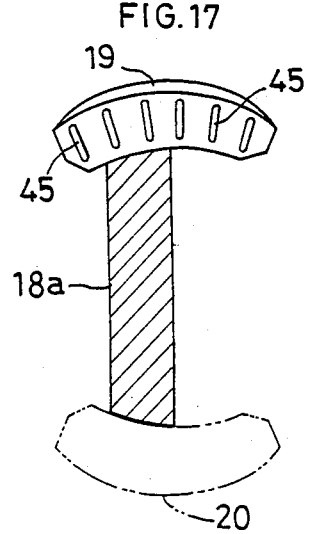
FIG. 17 is a side elevation showing a modified ridge on the intermediate joint member.
Figure 18:
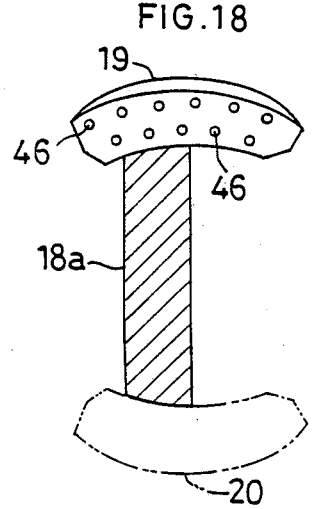
FIG. 18 is a side elevation showing another modified ridge on the intermediate joint member.

For example as seen in FIG. 15 or 16, the side faces of the arms 13 to 16 of the shafts 11, 12 are formed with a plurality of cavities, such as grooves 45 or pits 46, for holding a lubricant therein. Such lubricant holding grooves 45, pits 46 or the like can of course be formed also in the side faces of the ridges 19 to 22 of the joint member 10 as shown in FIG. 17 or 18.

Although the intermediate joint members 10 of the above embodiments are made of synthetic resin, an oil-impregnated sintered alloy or the like may be used for such intermediate joint members.

What is claimed is:

1. A universal joint including an intermediate joint member having a spherical portion as assembled and four ridges formed on the outer surface of the spherical portion and defining four guide furrows therebetween, and two shafts each having one end bifurcating into two arms, the two arms of one of the shafts being fitted in the two guide furrows included in the four furrows of the joint member and positioned symmetrically, the two arms of the other shaft being fitted in the other two guide furrows positioned symmetrically, the universal joint being characterized in that the entire intermediate joint member comprises two divided half segments arranged in combination axially of the joint member, a biasing member provided between the two half segments inside the contour of the spherical portion as assembled biasing the half segments circumferentially thereof out of register with each other prior to assembly of the spherical portion with said shafts and axially biasing the half segments away from each other.

2. A universal joint as defined in claim 1 wherein the biasing member is made of rubber.

3. A universal joint as defined in claim 2 wherein a cavity having radial portions is formed in each of the opposed combination faces of the two half segments of the joint member, and a rubber plate having radial portions is fitted in the cavities for biasing the two half segments circumferentially thereof out of register with each other and axially thereof away from each other.

4. A universal joint as defined in claim 3 wherein one half thickness of each radial rubber plate portion is circumferentially out of register with the other half thickness thereof.

5. A universal joint as defined in claim 3 or 4 wherein the rubber plate is substantially cross-shaped in resemblance to the contour of the combination face of each joint member half segment.

6. A universal joint as defined in claim 2 wherein a rubber plate is bonded to the opposed combination faces of the two half segments of the joint member.

7. A universal joint as defined in claim 6 wherein the rubber plate is substantially cross-shaped in resemblance to the contour of the combination face of each joint member half segment.

8. A universal joint as defined in claim 1 wherein the biasing member is a spring.

9. A universal joint as defined in claim 8 wherein the spring is a coiled torsion spring.

10. A universal joint as defined in claim 9 wherein a cavity is formed in each of the opposed combination faces of the two half segments of the joint member, and the coiled torsion spring is fitted in the cavities for biasing the two half segments circumferentially thereof out of register with each other and axially thereof away from each other.

11. A universal joint as defined in claim 1 wherein the surface of each arm of the two shafts to be brought into sliding contact with the ridge of the joint member is formed with lubricant retaining cavities.

12. A universal joint as defined in claim 1 wherein the surface of each ridge on the spherical portion to be brought into sliding contact with the shaft arm is formed with lubricant retaining cavities.

13. A universal joint including an intermediate joint member having a spherical portion as assembled and four ridges formed on the outer surface of the spherical portion and defining four guide furrows therebetween, and two shafts each having one end bifurcating into two arms, the two arms of one of the shafts being fitted in the two guide furrows included in the four furrows of the joint member and positioned symmetrically, the two arms of the other shaft being fitted in the other two guide furrows positioned symmetrically, the universal joint being characterized in that the spherical portion of the intermediate joint member comprises two divided half segments arranged in combination axially of the joint member, one of the half segments being integrally formed with two of the ridges positioned symmetrically and extending therefrom to over the outer surface of the other half segment, the other half segment being integrally formed with the other two ridges positioned symmetrically and extending therefrom to over the outer surface of said one half segment, a biasing member provided between the two half segments inside the contour of the spherical portion as assembled biasing the half segments circumferentially thereof out of register with each other prior to assembly of the spherical portion with said shafts and axially biasing the half segments away from each other.

14. A universal joint as defined in claim 13 wherein each of the two half segments of the spherical portion is formed in its outer surface with grooves for positioning the two ridges on the other half segment.

15. A universal joint as defined in claim 13 or 14 wherein each of the ridges on the two half segments of the spherical portion is formed with a slit extending over the entire length of the ridge approximately at the widthwise center thereof.

16. A universal joint as defined in any one of claims 13 or 14 wherein the surface of each arm of the two shafts to be brought into sliding contact with the ridge of the joint member is formed with lubricant retaining cavities.

17. A universal joint as defined in any one of claims 13 or 14 wherein the surface of each ridge on the two half segments to be brought into sliding contact with the shaft arm is formed with lubricant retaining cavities.

* * * * *